US006901303B2

(12) United States Patent
Larson et al.

(10) Patent No.: US 6,901,303 B2
(45) Date of Patent: May 31, 2005

(54) METHOD AND APPARATUS FOR CONTROLLING FANS AND POWER SUPPLIES TO PROVIDE ACCELERATED RUN-IN TESTING

(75) Inventors: Thane M. Larson, Roseville, CA (US); Akbar Monfared, Placerville, CA (US); Ian R. Inglis, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 571 days.

(21) Appl. No.: 09/919,659

(22) Filed: Jul. 31, 2001

(65) Prior Publication Data

US 2003/0037193 A1 Feb. 20, 2003

(51) Int. Cl.⁷ .......................... G06F 11/26; G01R 31/01
(52) U.S. Cl. .......................... 700/108; 700/21; 700/79; 700/81; 700/299; 700/300; 702/182; 324/760
(58) Field of Search .................................. 700/108, 109, 700/296, 299, 300, 21, 79, 81; 702/182, 183, 99, 82, 81; 324/760

(56) References Cited

U.S. PATENT DOCUMENTS 5,543,727 A * 8/1996 Bushard et al. ............. 324/760
6,246,969 B1 * 6/2001 Sinclair et al. ............. 702/113

FOREIGN PATENT DOCUMENTS

JP             411150166 A  *  6/1999

OTHER PUBLICATIONS

"Determining the Effectiveness of Run-in: a Case Study in the Analysis of Repairable–System Data", Zaino Jr. et al., IEEE Proceedings on Reliability and Maintainability Symposium, Jan. 21–23, 1992, pp. 58–70.*

"Thermal Control Hardware for Accelerated Run–In Testing of Multi–Chip Modules", IBM Technical Disclosure Bulletin, Oct. 1, 1989, vol. 32, No. 5A, pp. 129–130.*

"Method for Prioritizing Execution of Test Cases", IBM Technical Disclosure Bulletin, Jan. 1, 1993, vol. 36, No. 1, pp. 470–472.*

"Method for Controlling Test Execution in a Build–to–Order Test Environment", IBM Technical Disclosure Bulletin, Dec. 1, 1993, vol. 36, No. 12, pp. 67–68.*

* cited by examiner

Primary Examiner—Emanuel Todd Voeltz

(57) ABSTRACT

A method and apparatus controls fans and power supplies to provide accelerated run-in testing. By modulating fans to increase case temperatures and adjusting power supplies to provide "worst case" voltages, a computer system can be subjected to a run-in tests under taxing conditions. By alternately cooling and heating devices such as CPUs, devices can be subjected to mechanical stresses associated with power-on/power off cycles. A time based test implements the present invention based on time, and a temperature based test implements the present invention based on temperature. The present invention can be used to implement a run-in test in which the computer system is operated at an elevated temperature, thereby achieving results similar to those achieved by performing a run-in test in an environmental chamber at an elevated temperature. Alternatively, the a run-in test can be performed by repeatedly cycling the temperature between relatively high and low values.

26 Claims, 4 Drawing Sheets

METHOD AND APPARATUS FOR CONTROLLING FANS AND POWER SUPPLIES TO PROVIDE ACCELERATED RUN-IN TESTING

FIELD OF THE INVENTION

The present invention relates to run-in testing for products such as computer systems. Specifically, the present invention relates to modulating cooling fans and power supply voltages to increase case temperatures and "worst case" voltages to test a computer system before shipping the computer system to a customer.

DESCRIPTION OF THE RELATED ART

In the art of computing, as well as many other arts, it is generally considered to be a good practice to thoroughly test a product before the product is shipped to a customer. On such test that is known in the art is the "run-in" test, which is also known in the art as a "burn-in" test. When a product is subjected to a run-in test, the product is typically operated for an extended period of time under a variety of taxing conditions.

It is known in the art to perform a run-in test at a temperature above the temperature at which the product is expected to operate. One technique used to perform such a test to place the product in an environmental chamber, and alter the temperature of the environment. Unfortunately, environmental chambers tend to be relatively expensive, and therefore the ability to test a high volume of shipping product tends to be limited by the cost of the chamber.

SUMMARY OF THE INVENTION

The present invention is a method and apparatus for controlling fans and power supplies to provide accelerated run-in testing. By modulating cooling fans to increase case temperatures and adjusting power supplies to provide "worst case" voltages, a computer system can be subjected to run-in tests under taxing conditions. Also, by alternately cooling and heating devices such as central processing units (CPUs), such devices can be subjected to mechanical stresses associated with power-on/power off cycles.

Two embodiments of the present invention are disclosed. A time based test implements the present invention based on time, and a temperature based test implements the present invention based on temperature. With both tests, the computer system is powered on at an ambient temperature with one or more fans turned off or operating at a slower rotational speed.

In the time based test, a certain number of seconds are allowed to elapse, and in the temperature based test, the temperature is allowed to climb to certain temperature. Thereafter, the fans are cycled between normal operation and reduced operation (or off).

The time based test includes a watchdog check that aborts the test and restores normal fan operation if the temperature ever exceeds a maximum temperature, and the temperature based test has a watchdog check that aborts the test and restores normal fan operation if the time during which the fan is not operating normally exceeds a threshold value.

The present invention can be used to implement a run-in test in which the computer system is operated at an elevated temperature, thereby achieving results similar to those achieved by performing a run-in test in an environmental chamber at an elevated temperature. Alternatively, the a run-in test can be performed by repeatedly cycling the temperature between relatively high and low values. Such a test can be used to find electrical/mechanical failures produced by repeated heating and cooling cycles.

The present invention provides a way to perform a run-in test at elevated temperatures without requiring an environmental chamber. Since environmental chambers are relatively expensive, the present invention allows computer manufacturers to increase the quality of products shipped to customers, while minimizing costs.

DETAILED DESCRIPTION OF THE PREFERRED EMBODIMENTS

The present invention is a method and apparatus for controlling fans and power supplies to provide accelerated run-in testing. By modulating cooling fans to increase case temperatures and adjusting power supplies to provide "worst case" voltages, a computer system can by subjected to a run-in tests under taxing conditions. Also, by alternately cooling and heating devices such as the central processing unit (CPU), such devices can be subjected to mechanical stresses associated with power-on/power off cycles.

Figure 1:
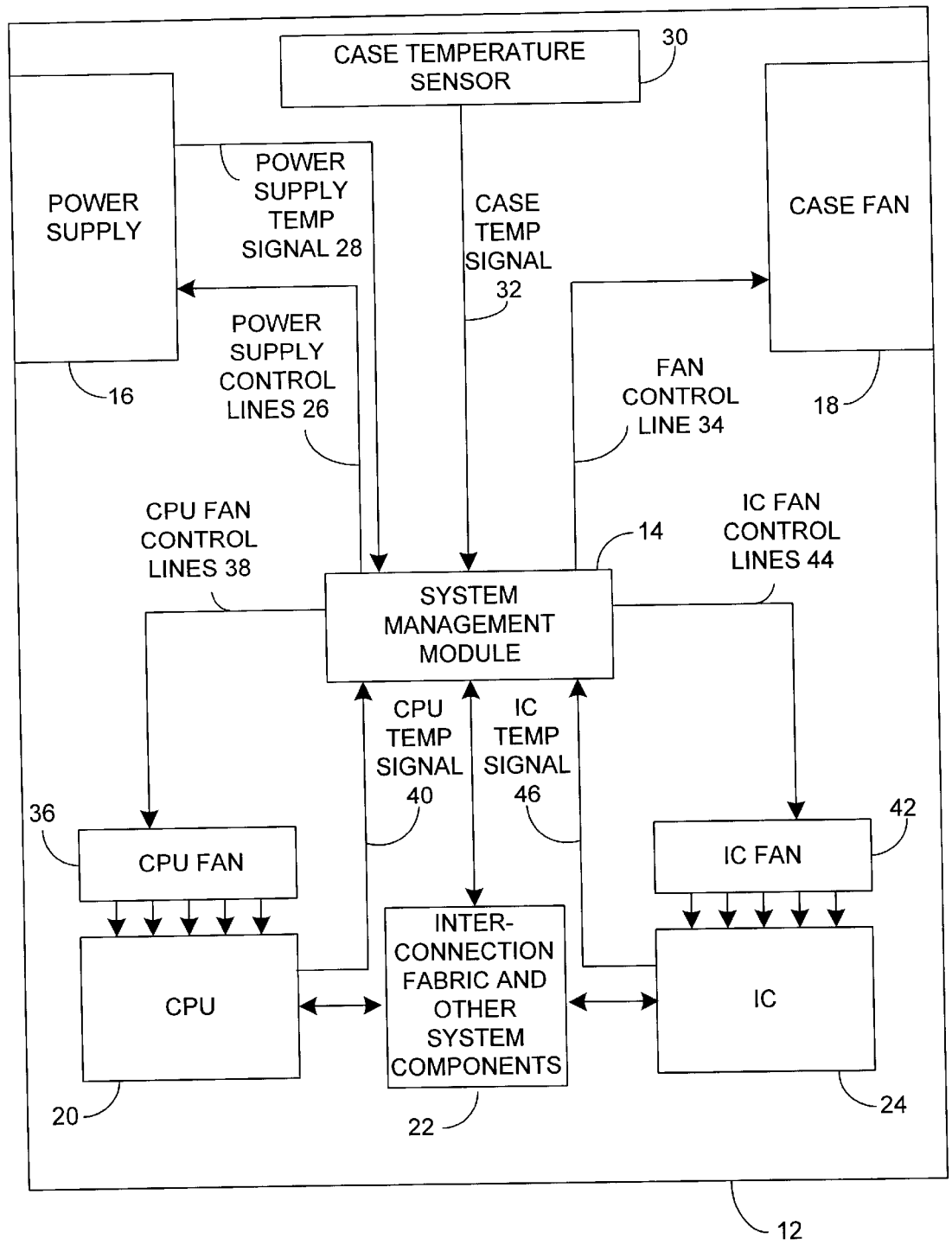
FIG. 1 is a block diagram of a representative computer system that is used to illustrate the present invention.

FIG. 1 is a block diagram of a representative computer system 10, which will be used to illustrate the present invention. Computer system 10 is enclosed in a case 12. At the heart of computer system 10, for the purposes of the present invention, is system management module 14, which executes an algorithm associated with the present invention. System 10 also includes a power supply 16, case fan 18, and a CPU 20.

Interconnection fabric and other system components block 22 represents all other components and interconnects that comprise the computer system, including expansion cards inserted into PCI slots, hard drives coupled to controller ports, floppy disk drives, modems, other types of plug-in modules, and the like. Some of these components may comprise integrated circuits (ICs) that are also cooled by a fan. For example, in many computer systems, it is common to have a "northbridge" IC that couples the CPU to main memory, cache memory, and video subsystems, and a "southbridge" IC that couples the CPU to various input/output (I/O) resources, such as peripheral component interconnect (PCI) busses, universal serial buses (USB), SCSI controllers, serial ports, parallel ports, mouse ports, and the like. Often the northbridge and southbridge ICs are coupled to heatsinks and fans. In addition, it is also common to couple a heatsink and fan to a video controller chip. IC 24 represents any other ICs that are cooled by fans. IC 24 is also coupled to interconnection fabric and other system components block 22.

Power supply control lines 26 are coupled between system management module 14 and power supply 16. Typically, lines 26 will at least provide module 14 with the ability to stop the fan (or fans) of power supply 16. However, lines 26 may also provide the ability to vary the rotational speed of the fan, reverse the direction of the fan, and vary the voltages provided by power supply 16. Power supply temperature signal 28 is also coupled between system management module 14 and power supply 16, and reports the temperature of power supply 16 to module 14.

Case temperature sensor 30 is coupled to module 14 via case temp signal 32. Sensor 30 reports the interior temperature of case 12 to module 14.

Fan control line 34 is coupled between case fan 18 and system management module 14. Line 34 will typically at least provide the ability to stop fan 18, and may also provide the ability to vary the rotational speed of the fan and reverse the direction of the fan.

CPU fan 36 is disposed to cool CPU 20. Typically, CPU 20 will be coupled to a heatsink, which in turn is coupled to fan 36. Of course, other cooling arrangements are known in the art. CPU fan control lines 38 are coupled between fan 36 and module 14, and typically provide module 14 with the ability to stop fan 36, and may also provide the ability to vary the rotational speed of the fan and reverse the direction of the fan. CPU temperature signal 40 is coupled between a temperature sensor (not shown in FIG. 1) disposed to sense the temperature of CPU 20, and module 14, and reports the temperature of CPU 20 to module 14.

IC fan 42 is disposed to cool IC 24. Typically, IC 24 will be coupled to a heatsink, which in turn is coupled to fan 42. As mentioned above, other cooling arrangements are known in the art. IC fan control lines 44 are coupled between fan 42 and module 14, and typically provide module 14 with the ability to stop fan 42, and may also provide the ability to vary the rotational speed of the fan and reverse the direction of the fan. IC temperature signal 46 is coupled between another temperature sensor (not shown in FIG. 1) disposed to sense the temperature of IC 24, and module 14, and reports the temperature of IC 24 to module 14.

Of course, computer system 10 is a simplified block diagram of a computer system designed to illustrate the present invention. A typical high-end server computer system will generally have many more power supplies, temperature sensors, case fans, CPUs, and ICs that need to be cooled. Also note that the various control and sensor signals and lines shown in FIG. 1 may be carried by any means known in the art, such as a bus that also carries various types of data, with the control and sensor data carried by commands that travel over the bus.

Also note that system management module 14 can be implemented by a separate service processor, which is often provided in a high-end server computer system. Alternatively, the functions provided by system management module 14 can be implemented by BIOS code, or other system code, that is executed by a CPU of computer system 10. Such an implementation could be used in a desktop PC or a low-end server computer system.

Figure 2:
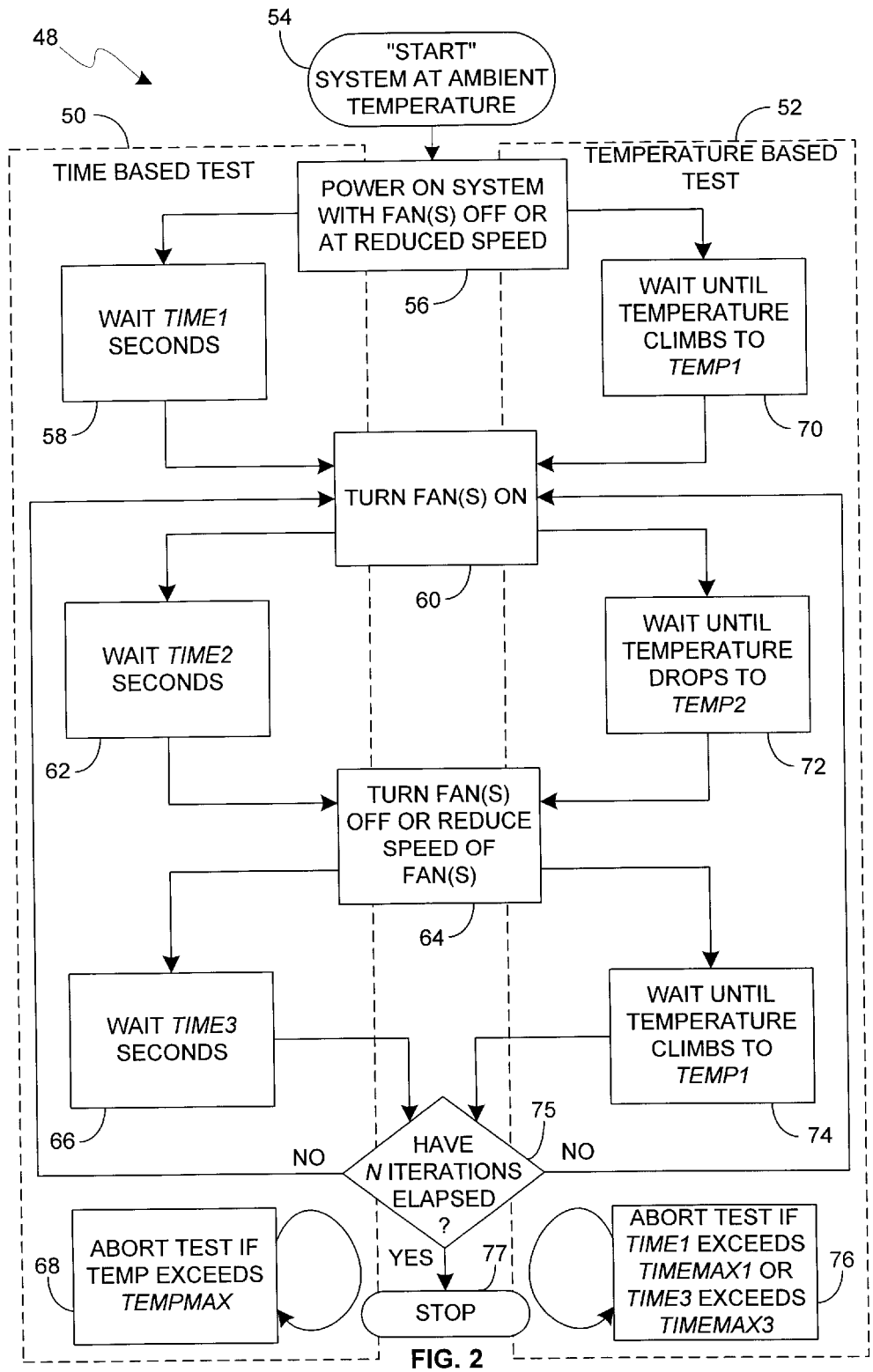
FIG. 2 is a flow chart illustrating the present invention.
Figure 3:
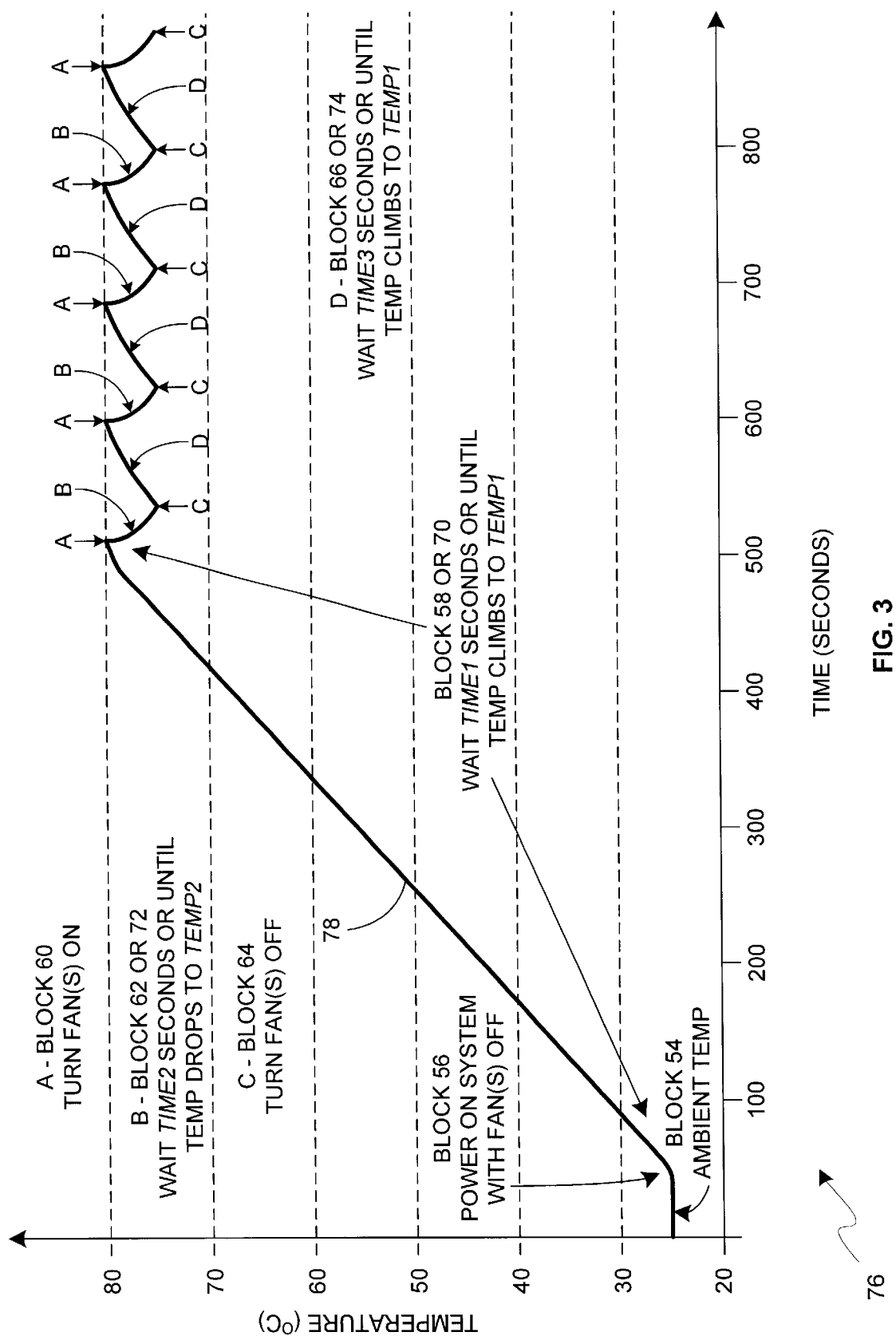
FIG. 3 is a graph showing a temperature versus time curve as the algorithm of the present invention is executed to hold the computer system of FIG. 1 at a relatively constant elevated temperature.
Figure 4:
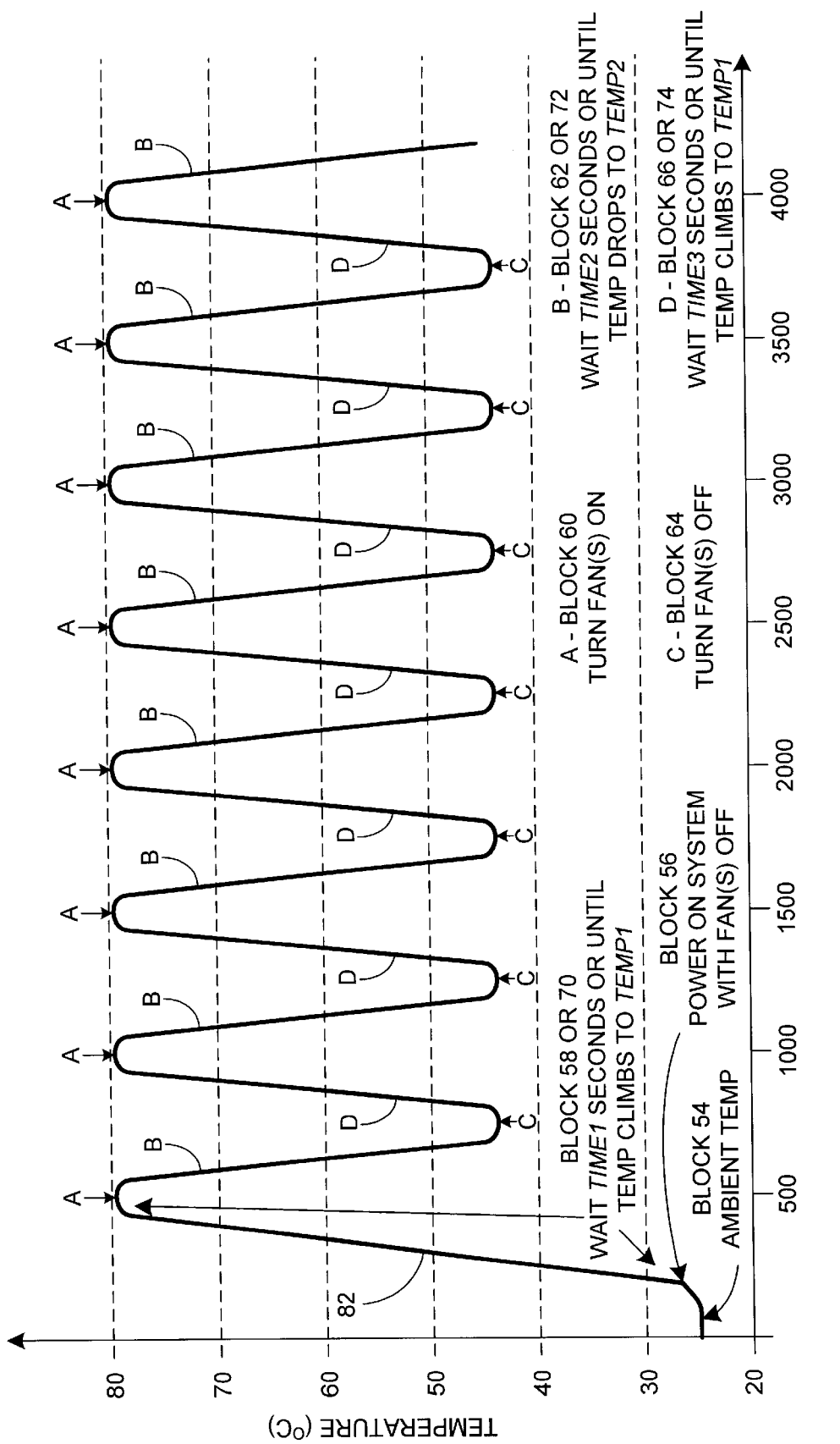
FIG. 4 is a graph showing a temperature versus time curve as the algorithm of the present invention is executed to subject the computer system of FIG. 1 to repeated cycles of high and low temperatures.

A flow chart 48 illustrating the present invention is shown in FIG. 2. FIG. 3 and 4 are graphs 76 and 80, respectively, showing temperature versus time curves as the algorithm of the present invention is executed. Note that the blocks referenced in FIG. 2 are labeled at appropriate points in the graphs of FIGS. 3 and 4. With reference to FIG. 2, two different embodiments of the present invention are shown. Time based test 50 implements the present invention based on time, and temperature based test 52 implements the present invention based on temperature.

At block 54, the test is started, with the system at an ambient temperature of about 25° Celsius. At block 56, computer system 10 is powered on, with one or more fans turned off. As will be described in greater detail below, it may be desirable to leave all fans in computer system 10 off, or leave off a subset of fans. Also, as an alternative to turning fans off, it may be desirable to operate the fans at a slower rotational speed to achieve a gentler warming effect.

In time based test 50, time1 seconds are allowed to elapse at block 58. In temperature based test 52, the temperature is allowed to climb to temp1 at block 70. In FIG. 3, this is illustrated in curve 78 from about 50 seconds to about 500 seconds, ending at the first instance of label A. Accordingly, in FIG. 3, time1 for time based test 50 is about 450 seconds, and temp1 for temperature based test 52 is about 80° C. Note that the temperatures shown in the graphs of FIGS. 3 and 4 are consistent with the temperature being measured at CPU 20 or IC 24, with 80° C. being a typically upper limit for a CPU die temperature. If the temperature is measured by a case sensor, such as sensor 30 in FIG. 1, a temp1 temperature of 40° to 50° C. would be more appropriate.

After time1 seconds elapse at block 58, or the temperature is allowed to climb to temp1 at block 70, control passes to block 60, where the fans are turned on to normal speed. At this point, the temperature begins to drop. For time based test 50, control passes to block 62, where time2 seconds are allowed to elapse (about 25 seconds in FIG. 3). For temperature based test 52, control passes to block 72, where the temperature is allowed to drop to temp2 (about 75° C. in FIG. 3). This is illustrated by the first occurrence of label B in FIG. 3. Control then passes to block 64, where the fans are turned off, or are operated with reduced rotational speed, which is illustrated by the first occurrence of label C in FIG. 3.

At this point, the temperature again begins to rise and control passes to block 66 in timed passed test 50, or control passes to block 74 in temperature based test 52. In time based test 50, time3 seconds are allowed to elapse at block 66 (about 66 seconds). In temperature based test 52, the temperature is allowed to climb to temp1 at block 74. This is illustrated by the first occurrence of label D in FIG. 3. At this point, for either time based test 50 or temperature based test 52, control passes to decision block 75.

Decision block 75 determines whether N temperature/time control iterations have elapsed. It may be desirable to run the test continuously, in which case, N can be set to a very high number, or decision block 75 can be modified to loop continuously or terminate using some other method, such as a keystroke sequence. Alternatively, it may be desirable to have the test run for a limited number of iterations. In FIG. 3, each cycle lasts about 88 seconds, so if N where set to 123, the test would run for about three hours. Of course, decision block 75 could also be replaced be a real time counter that executes the test for a period of time regardless of the number of temperature/time control iterations.

At decision block 75, if N iterations have elapsed, the "YES" branch is taken to "STOP" block 77, and the test is terminated. However, in N iterations have not elapsed, the "NO" branch of either test 50 or 52 is taken to block 60, the fans are turned on, and the cycle is repeated with subsequent occurrences of labels A, B, C, and D in FIG. 3.

Also note that each test has a watchdog block. Time based test 50 has a watchdog block 68 that aborts the test and restores normal fan operation if the temperature ever exceed tempmax, and temperature based test 52 has a watchdog block 76 that aborts the test and restores normal fan operation if the time of the initial temperature ramp-up (time1) ever exceed timemax1, or subsequent periods of reduced fan operation (time3) ever exceed timemax3.

Note that in FIG. 3, temperature based test 52 operates in a manner similar to a thermostat, with the temperature allowed to rise until the desired temperature is reached, and then cycling the fan or fans between a normal mode and a reduced mode (or off) to maintain the desired temperature. In contrast, time based test 50 allows the temperature to increase for a given period of time, and then operates the fan using a reduced duty cycle, which is about 29% in FIG. 3. Of course, other target temperatures and duty cycles can be used with the present invention, and the times and temperatures shown in FIG. 3 are merely examples.

Also note that if fans having continuously variable speeds are available, the present invention can be adapted to reach a steady state wherein the fan is eventually operated at a continuous speed that maintains the temperature at the desired elevated level. In essence, this could be implemented by using a feedback loop to increase the fan speed if the temperature is above the desired temperature, and decrease the fan speed if the temperature is below the desired temperature.

Note that it may be desirable to only run this test as part of a manufacturing process, and not allow the test to be performed by an end user. Accordingly, it may be wise to provide a password to gain access to the test. Furthermore, it may be wise to implement the test in a manner that ensures that the test is not restarted if power to the computer system is interrupted while the test is executing, and later restored.

Using the parameters shown in FIG. 3, the present invention allows a run-in test capable of achieving results similar to those achieved by performing a run-in test in an environmental chamber at an elevated temperature. Typically, the run-in test will be performed for an extended period of time, such as several hours. During the run-in test, typically power-on selftest (POST) routines and other system diagnostics will be executed. Of course, it may also be desirable to conduct the test while executing a typical suite of applications. Furthermore, while performing the run-in test, it may be desirable to alter the voltages provided by the power supplies to minimum and maximum acceptable values.

One of the advantages of the present invention, compared to an environmental chamber, is that it is possible to test some components at elevated temperatures, while operating the remainder of the system at normal temperatures. For example, it is possible to operate all case fans and power supply fans normally, while only cycling the CPU fan, thereby testing the CPU. Alternatively, it is possible to test a power supply by only cycling the power supply fan. In addition, all CPU, IC, and power supply fans can be operated normally, while cycling the case fan, thereby testing other components within the case at elevated temperature. Also note that by reversing power supply fans, it is possible to operate the power supplies at normal temperatures, while blowing hot air from the power supplies into the case, thereby warming the interior of the case. These techniques may prove useful when trying to isolate a difficult to find hardware problem.

By varying the parameters of the algorithm shown in FIG. 2, it is possible to implement another type of run-in test, as shown in FIG. 4. As computer systems are power up and powered down, various components expand as they are heated, and contract as they are cooled. For example, consider a CPU socket that is soldered to a printed circuit board (PCB). As the temperature of the CPU increases, so does the temperature of the socket. These heating and cooling cycles produce mechanical stresses at the points where the socket pins are soldered to the PCB. If a particular pin has a poor solder connection to the PCB, over time these heating and cooling cycles can cause the solder connection to fail.

In FIG. 4, temperature curve 82 of graph 80 represents a test designed to find problems related to repeated heating and cooling cycles. FIG. 4 is similar to FIG. 3, except that the temperature is not held at a relatively constant value. Rather, the temperature is repeated cycled between relatively high and low values. In FIG. 4, the temperature swings between about 45° C. and 80° C. about every 1000 seconds. Such a test may find a bad solder connection between a PCB and CPU socket.

The present invention provides a way to perform a run-in test at elevated temperatures without requiring an environmental chamber. Since environmental chambers are relatively expensive, the present invention allows computer manufacturers to increase the quality of products shipped to customers, while minimizing costs.

Although the present invention has been described with reference to preferred embodiments, workers skilled in the art will recognize that changes may be made in form and detail without departing from the spirit and scope of the invention.

What is claimed is:

1. A method of performing a run-in test in a computer system having at least one cooling fan that is capable of operating at a normal rotational speed and a reduced rotational speed comprising:

operating one or more cooling fans at the reduced rotational speed to cause a temperature within the computer system to reach a level above a normal operating level; and executing software routines that verify the integrity of the computer system.

2. The method of claim 1 wherein operating one or more cooling fans at the reduced rotational speed comprises:

waiting a first time period with the one or more cooling fans operating at the reduced rotational speed; and repeatedly cycling the one or more cooling fans between the normal and reduced rotation speed at a duty cycle to maintain the temperature within the computer system at the level above the normal operating level.

3. The method of claim 2 wherein the computer system includes a temperature sensor, and the method further comprises:

monitoring the temperature within the computer system; and aborting the run-in test if the temperature exceeds a maximum threshold temperature.

4. The method of claim 3 wherein temperature sensor monitors the temperature within a case of the computer system.

5. The method of claim 3 wherein the temperature sensor monitors the temperature of a central processing unit.

6. The method of claim 1 wherein the reduced rotation speed is achieved by powering off the one or more fans off.

7. The method of claim 1 wherein the computer system includes a temperature sensor, and operating one or more cooling fans at the reduced rotational speed comprises:

operating the one or more cooling fans at the reduced rotational speed until the temperature reported by the temperature sensor reaches a first threshold; and repeatedly cycling the one or more cooling fans between the normal and reduced rotational speeds to maintain the temperature reported by the temperature sensor between the first threshold and a second threshold.

8. The method of claim 7 and further comprising:

aborting the run-in test if the one or more cooling fans are allowed to operate at the reduced rotational speed for more than a threshold time period.

9. The method of claim 7 wherein temperature sensor monitors the temperature within a case of the computer system.

10. The method of claim 7 wherein the temperature sensor monitors the temperature of a central processing unit.

11. The method of claim 7 wherein the reduced rotation speed is achieved by powering off the one or more cooling fans.

12. The method of claim 1 wherein operating one or more cooling fans at the reduced rotational speed to cause a temperature within the computer system to reach a level above a normal operating level comprises repeatedly and alternately operating one or more cooling fans at the reduced rotational speed and the normal rotational speed to cause the temperature to swing between the normal operating level and the level above the normal operating level to simulate repeated power-on/power-off cycles.

13. The method of claim 1 wherein the computer system includes a power supply, and voltages provided by the power supply are varied during the run-in test to either minimum or maximum allowable values.

14. A computer system comprising:

a case having a case fan;

a power supply having a power supply fan;

a CPU having a CPU fan;

a temperature sensor; and a system management module coupled to the case fan, the power supply and power supply fan, the CPU and CPU fan, and the temperature sensor, the system management module implementing a run-in test at a temperature above a normal operating temperature by operating one or more of the fans at a reduced rotational speed to cause a temperature within the case to reach the level above a normal operating level.

15. The computer system of claim 14 wherein the system management module operates the one or more fans at the reduced rotational speed by waiting a first time period with the one or more fans operating at the reduced rotational speed and repeatedly cycling the one or more fans between the normal and reduced rotation speed at a duty cycle to maintain the temperature with the computer system at the level above a normal operating level.

16. The computer system of claim 15 wherein the system management module monitors the temperature within the computer system and aborts the run-in test if the temperature exceeds a maximum threshold temperature.

17. The computer system of claim 16 wherein temperature sensor monitors the temperature within a case of the computer system.

18. The computer system of claim 16 wherein the temperature sensor monitors the temperature of a central processing unit.

19. The computer system of claim 14 wherein the system management module reduces rotation speed is by powering off the one or more fans off.

20. The computer system of claim 14 wherein the system management module operates the one or more cooling fans at the reduced rotational speed by operating the one or more fans at the reduced rotational speed until the temperature reported by the temperature sensor reaches a first threshold, and repeatedly cycling the one or more fans between the normal and reduced rotational speeds to maintain the temperature reported by the temperature sensor between the first threshold and a second threshold.

21. The computer system of claim 20 wherein the system management module aborts the run-in test if the one or more fans are allowed to operate at the reduced rotational speed for more than a threshold time period.

22. The computer system of claim 20 wherein temperature sensor monitors the temperature within a case of the computer system.

23. The computer system of claim 20 wherein the temperature sensor monitors the temperature of the CPU.

24. The computer system of claim 20 wherein the reduced rotational speed is achieved by powering off the one or more fans.

25. The computer system of claim 14 wherein the system management module operates the one or more cooling fans by repeatedly and alternately operating the one or more cooling fans at the reduced rotational speed and the normal rotational speed to cause the temperature to swing between the normal operating level and the level above the normal operating level to simulate repeated power-on/power-off cycles.

26. The computer system of claim 14 wherein the system management module varies voltages provided by the power supply during the run-in test to either minimum and maximum allowable values.

* * * * *